United States Patent
Ullidtz

(10) Patent No.: US 8,892,367 B2
(45) Date of Patent: Nov. 18, 2014

(54) DETERMINATION OF SUBGRADE MODULUS AND STIFFNESS OF PAVEMENT LAYERS FOR MEASUREMENT OF BEARING CAPACITY UNDER FAST MOVING WHEEL LOAD

(75) Inventor: Per Ullidtz, Copenhagen (DK)

(73) Assignee: Dynatest International A/S, Glostrup (DK)

( * ) Notice: Subject to any disclaimer, the term of this patent is extended or adjusted under 35 U.S.C. 154(b) by 630 days.

(21) Appl. No.: 12/906,913

(22) Filed: Oct. 18, 2010

(65) Prior Publication Data

US 2012/0010828 A1 Jan. 12, 2012

Related U.S. Application Data

(60) Provisional application No. 61/252,505, filed on Oct. 16, 2009.

(51) Int. Cl.
| | |
|---|---|
| *G01L 5/00* | (2006.01) |
| *G01B 21/20* | (2006.01) |
| *G01M 5/00* | (2006.01) |
| *G01B 21/32* | (2006.01) |
| *G01B 21/08* | (2006.01) |

(52) U.S. Cl.
CPC ............. *G01M 5/0041* (2013.01); *G01B 21/20* (2013.01); *G01B 21/32* (2013.01); *G01B 21/08* (2013.01)
USPC ............................................ 702/42; 702/173

(58) Field of Classification Search
CPC .. G01M 5/0041; G01M 11/081; G01B 21/08; G01B 21/20; G01B 21/32
USPC ..................... 702/42, 43, 173, 175
See application file for complete search history.

(56) References Cited

U.S. PATENT DOCUMENTS

| | | | | |
|---|---|---|---|---|
| 4,571,695 | A | * | 2/1986 | Elton et al. ..................... 702/167 |
| 4,573,131 | A | | 2/1986 | Corbin |
| 4,708,516 | A | * | 11/1987 | Miller ............................. 404/31 |

(Continued)

FOREIGN PATENT DOCUMENTS

| | | | |
|---|---|---|---|
| JP | 2002371503 A | * | 12/2002 |
| KR | 2007-0013705 A | | 7/2007 |

OTHER PUBLICATIONS

Johnson et al., Rolling Weight Deflectometer with Thermal and Vibrational Bending Compensation, Transportation Research Record 1540, vol. 1540, pp. 77-82, 1996.*

(Continued)

*Primary Examiner* — John Breene
*Assistant Examiner* — Timothy H Hwang
(74) *Attorney, Agent, or Firm* — Koppel, Patrick, Heybl & Philpott

(57) ABSTRACT

The present invention directed to rolling weight deflectometers having sensors to measure pavement deflection, and to provide test data to determine the subgrade modulus and equivalent thickness of pavements. This information is then utilized to determine more than deflection and according to the present invention is utilized to determine critical strain parameters that can be applied to predict bearing capacity, rutting and roughness characteristics of pavements. This invention enhances the value of pavement testing while at the same time allowing for testing systems having fast moving wheel loads. The collected data can be used to determine vertical compressive strain and horizontal tensile strain, which can be more valuable for the prediction of remaining life time and recommendations for repair and maintenance.

24 Claims, 4 Drawing Sheets

(56) References Cited

U.S. PATENT DOCUMENTS

| | | | |
|---|---|---|---|
| 4,788,859 | A | 12/1988 | Khattak |
| 5,046,366 | A | 9/1991 | Basson |
| 5,258,961 | A | 11/1993 | Sehr et al. |
| 5,280,719 | A | 1/1994 | Noss |
| 5,393,167 | A | 2/1995 | Fujita et al. |
| 5,753,808 | A * | 5/1998 | Johnson ............ 73/146 |
| 5,952,561 | A | 9/1999 | Jaselskis |
| 6,119,353 | A * | 9/2000 | Grønskov ............ 33/1 Q |
| 6,499,339 | B1 * | 12/2002 | Hedstrom ............ 73/81 |
| 2003/0172077 | A1 | 9/2003 | Godbersen et al. |
| 2005/0204572 | A1 | 9/2005 | Schajer et al. |
| 2007/0083341 | A1 * | 4/2007 | Gutierrez et al. ............ 702/173 |
| 2008/0219764 | A1 | 9/2008 | Prem |
| 2010/0316445 | A1 * | 12/2010 | Kasahara et al. ............ 404/77 |
| 2011/0035056 | A1 * | 2/2011 | Richards ............ 700/275 |

OTHER PUBLICATIONS

Definition of "first", thefreedictionary.com, http://www.thefreedictionary.com/p/first, last accessed (Aug. 16, 2013).*

International Search Report and Written Opinion in counterpart application No. PCT/US2010/002791 mailed Jul. 1, 2011.

International Search Report and Written Opinion for PCT Application No. PCT/US2010/002792 mailed Jul. 1, 2011.

Examination Report from Danish Patent Application No. PA2012 00348, dated Nov. 22, 2013 (received Feb. 28, 2014).

Patent Examination Report for Australian Patent Appl. No. 2010307335. dated Aug. 7. 2014.

* cited by examiner

Deflection d1 from Equation 2 Versus Theoretical Deflection

Deflection d2 from Equation 2 Compared to Theoretical Deflection

DETERMINATION OF SUBGRADE MODULUS AND STIFFNESS OF PAVEMENT LAYERS FOR MEASUREMENT OF BEARING CAPACITY UNDER FAST MOVING WHEEL LOAD

This application claims the benefit of U.S. Provisional Patent Application No. 61/252,505 to Ullidtz et al., filed on Oct. 16, 2009.

BACKGROUND OF THE INVENTION

1. Field of the Invention

This invention relates to nondestructive testing of pavements and in particular to methods and apparatus for determination of subgrade modulus and stiffness of pavements using rolling wheel deflectometers.

2. Description of the Related Art

Load bearing capability for airport runways or highways pavements may deteriorate, over time, due to a number of factors, including changes in the elastic moduli of subpavement layers of earth. In order to determine pavement condition for airport runways or highways, the load bearing capability of the pavement can be periodically tested. In order to measure the load bearing capability of the pavement, it is desirable to utilize technologies that are nondestructive so that the integrity of the pavement layer is maintained. Further, the measurements should desirably be made rapidly, through an automated system, to minimize time and reduce costs.

Different methods have been developed for the non-destructive testing of pavements, with one utilizing a falling weight dropped on the pavement from a stationary platform. Sensors then measure the deflection of the pavement at intervals out from the falling weight. Systems utilizing this method are commonly referred to as falling weight deflectometers (FWD or FWDs).

Other systems utilize a fast moving, heavy wheel load that rolls along the pavement, with sensors being arranged and intervals out from the wheel to measure deflection. Systems utilizing this approach are commonly referred to as rolling weight deflectometers (RWD or RWDs). A device of this type is disclosed in U.S. Pat. No. 4,571,695. In essence, a load is placed on a wheel that rolls across the pavement and the depth of a deflection basin created by the loaded wheel is measured using precision laser sensors mounted on a horizontal member that tracks with the wheel. Such deflection measurements provide insight into the load bearing capability of the pavement. However, pavement deflections are usually very small, typically 0.010 to 0.040 inch for a 20,000 pound applied load. Therefore, not only are extremely sensitive sensors required to measure the deflection, but the sensors should have a stable reference plane.

The deflection of the pavement surface under a fast moving, heavy wheel load may be measured through triangulation. A simple algorithm for a system using four sensors was developed by Professor Milton Harr of Purdue University (See Harr, M., and N. Ng-A-Qui, 1977, "Noncontact, Nondestructive Determination of Pavement Deflection Under Moving Loads," FAA-RD-77-127, U.S. Department of Transportation, Washington D.C.).

The Harr algorithm was published 30 years ago and several systems for road testing are based on this approach. The method is illustrated in FIG. 1. (See Briggs, R. C., Johnson, R. F., Stubstad, R. N., and Pierce, L., "A Comparison of the Rolling Weight Deflectometer with the Falling Weight Deflectometer," Nondestructive Testing of Pavements and Backcalculation of Moduli: Third Volume, ASTM STP 1375, S. D. Tayabji and E. O. Lukanen, Eds., American Society for Testing and Materials, West Conshohocken, Pa., 1999.)

Using the approach shown in FIG. 1, the sensors are placed at equal distances apart and two sets of measurements are carried out, at points with spacing equal to the distance between the sensors. From the first set of measurement the distance, h, from a reference line, through points $P_1$ and $P_2$, to the pavement surface at point $P_3$ is calculated from $$h = A - 2 \times B + C$$

where A, B and C are the measured distances from the beam to the pavement surface at points $P_1$, $P_2$ and $P_3$, respectively, during the first set of measurements.

From the second set of measurements the same distance may be calculated from:

$$h' = B' - 2 \times C' + D'$$

where B', C' and D' are the measured distances from the beam to the pavement surface at points $P_1$, $P_2$ and $P_3$, respectively, during the second set of measurements.

If there is no deflection under the load of the wheel, h' and h will be identical, so the difference between h' and h is the deflection of the pavement caused by the wheel load. The combination of the equations above is commonly known as "Harr's algorithm".

Pavement deflection alone provides limited information regarding the bearing capacity of a pavement. In the mechanistic-empirical method of pavement design, the permissible number of load applications, to cause a certain level of damage to the pavement structure, is determined from the critical stresses or strains in the pavement layers. Rutting or roughness of a pavement are normally related to the vertical compressive strain at the top of the subgrade, and cracking to the horizontal tensile strain at the bottom of a cement- or bitumen-bound layer.

SUMMARY OF THE INVENTION

Embodiments of the invention rely on the use of many sensors to measure more than the pavement deflection only, and to provide test data to determine the subgrade modulus and equivalent thickness of pavements. This allows the present invention to determine the critical strain parameters that can be applied to predict bearing capacity, rutting and roughness characteristics of pavements. This invention enhances the value of pavement testing while at the same time allowing for testing systems having fast moving wheel loads. The collected data can be used to determine vertical compressive strain and horizontal tensile strain, which can be more valuable for the prediction of remaining life time and recommendations for repair and maintenance.

One embodiment of a rolling weight pavement measurement system according to the present invention comprises a rolling weight and a sensor holding frame arranged to move in unison with said rolling weight. More than four sensors mounted to said frame with equal distance between adjacent ones of said sensors, with one of said sensors mounted approximately at the rolling weight. Each of the sensors measure the distance between it and the pavement, wherein the distance measurements are used to calculate strain measurements in said pavement.

One embodiment of a pavement deflection measurement system according to the present invention comprises a weight for causing deflection in the pavement sensors arranged with equal distance between adjacent ones of the sensors, with one of the sensors arranged approximately at the weight. Each of the sensors measures the distance between it and the pavement being measured, and wherein the distance between adjacent ones of the sensors is larger than the equivalent thickness of the pavement layers in the pavement being measured, and wherein the distance measurements are used to calculate strain measurements in said pavement.

One method for measuring the deflection of pavement according to the present invention comprises providing a rolling weight on the pavement and measuring the distance between said rolling weight and said pavement. The distance to the pavement at four equal distance measuring points ahead of said rolling weight is also measured. The weight is then rolled a first time at a distance equal to the distance between said measuring points and the distance to the pavement a second time at said rolling weight and the measuring points. The weight is then rolled a second time at a distance equal to the distance between said measuring points and the distance to the pavement is measured a third time at the rolling weigh and the measuring points. Strain measurements are then calculated in said pavement from the distance measurements.

These and other aspects and advantages of the invention will become apparent from the following detailed description and the accompanying drawings which illustrate by way of example the features of the invention.

DETAILED DESCRIPTION OF THE INVENTION

The present invention is directed to systems that provide non-destructive testing of pavements and in particular calculation methods using RWDs for determination of subgrade modulus and stiffness of pavement layers. According to the present invention, an estimate of these critical strains, such as the vertical compressive strain and horizontal tensile strain, may be obtained from different measurements and calculations, such as the so-called subgrade elasticity modulus and the equivalent thickness.

The present invention is described herein with reference to certain embodiments, but it is understood that the invention can be embodied in many different forms and should not be construed as limited to the embodiments set forth herein. In particular many different sensor and wheel load arrangements can be provided beyond those described above, and many different sensors and loads can be used. The invention is described below with reference to using five sensors to provide for more accurate deflection measurements, but it is understood that more than five sensors can be used in different embodiments according to the present invention, such as six, seven, eight, nine or more.

It is also understood that when an element such as a layer, region or substrate is referred to as being "on" another element, it can be directly on the other element or intervening elements may also be present. Furthermore, relative terms such as "above" and "below", and similar terms, may be used herein to describe a relationship of one layer or another region. It is understood that these terms are intended to encompass different orientations of the device in addition to the orientation depicted in the figures.

Although the terms first, second, etc. may be used herein to describe various elements and/or components, these elements and/or should not be limited by these terms. These terms are only used to distinguish one element or component from another element or component. Thus, a first element or component could be termed a second element or component without departing from the teachings of the present invention.

Embodiments of the invention are described herein with reference to schematic view illustrations. As such, the actual dimensions of the elements of the present invention may vary depending on the particular arrangement of the invention as well as the manufacturing techniques employed. Embodiments of the invention should not be construed as limited to the particular shapes or sizes of the elements illustrated herein but are to include deviations. Thus, the elements illustrated in the figures are schematic in nature and their shapes are not intended to illustrate the precise shape of an element and are not intended to limit the scope of the invention.

Figure 1:
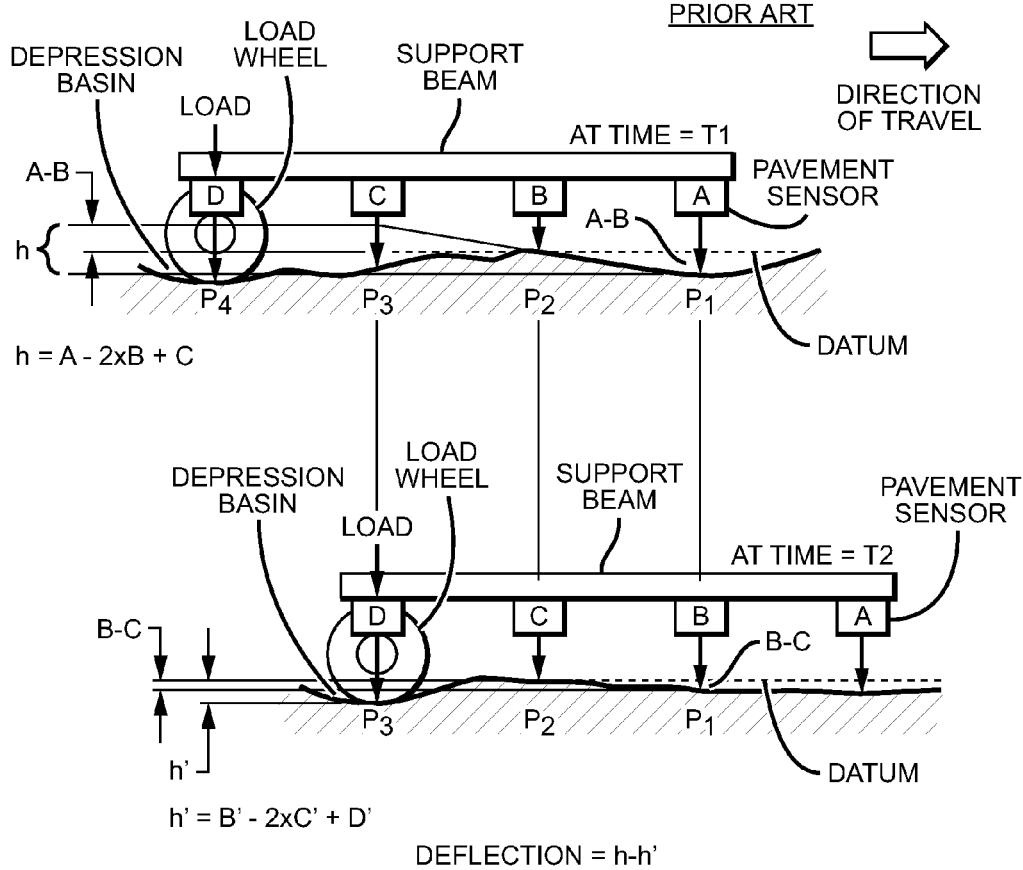
FIG. 1 is a schematic showing a prior art RWD system using four sensors.
Figure 2:
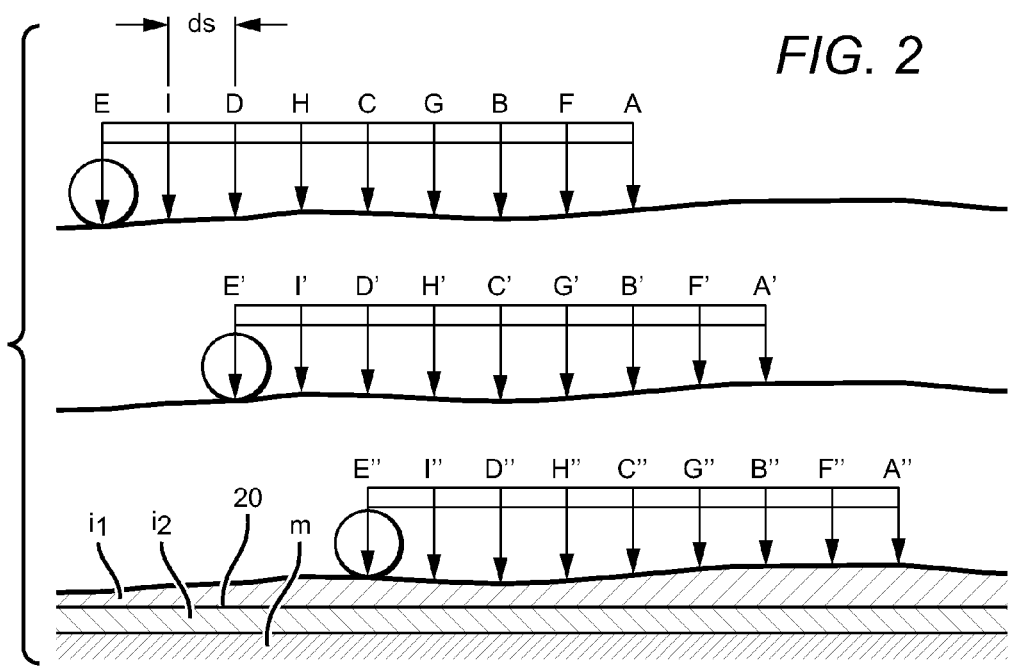
FIG. 2 is a schematic of one embodiment of a RWD system using nine sensors.

The deflections of a pavement surface under a fast moving wheel load may be measured correctly through triangulation using more than four sensors, as described in U.S. Provisional Patent Application Ser. No. 61/252,488 and U.S. patent application Ser. No. 12/906,896, both to Ullidtz et al., and both entitled "Triangulation of Pavement Deflections Using More Than Four Sensors", which are also assigned to Dynatest International A/S and incorporated herein by reference. An example using nine sensors is shown in FIG. 2.

The distance between the sensors, ds, must be larger than half the equivalent thickness of the pavement, calculated from:

$$h_e = \sum_{i=1}^{m-1} h_i \times \sqrt[3]{\frac{E_i}{E_m}}$$

where
  $h_e$ is the equivalent thickness,
  $h_i$ is the thickness of layer i,
  $E_i$ is the modulus of layer i, and
  $E_m$ is the modulus of the subgrade (layer m).

With the sensor array shown in FIG. 2 it is possible to determine three points of the deflection basin. The deflection of the pavement at sensors E, $d_1$, I, $d_2$, and D, $d_3$, may be calculated from three sets of measurements, at distances of 2×ds, as shown in FIG. 2.

$$d_3 = k \times (B' - 2 \times C' + D' - A + 2 \times B - C)$$

$$d_1 = (C'' - d_3/2) - 2 \times (D'' - d_3) + E'' - (B' - d_3/3) + 2 \times (C' - d_3/2) - (D' - d_3)$$

$$d_2 = (G'' - 2/5 d_3) - 2 \times (H'' - 2/3 d_3) + I'' - (F' - 2/7 d_3) + 2 \times (G' - 2/5 d_3) - (H' - 2/3 d_3)$$

where the sensor positions are as given in FIG. 2, and k is a constant determined from a regression analyses using methods know in the art. The value of k depends on the wheel configuration. With the example shown below, k was found to be 3.6. For a beam mounted on a truck, k should be adjusted for the influence of the deflections from all of the truck wheel loads.

In experimentation, the surface deflections were calculated using the commercially available layered elastic computer program WesLea, using a wide range of pavement structures. A 50 kN single wheel load was applied. The contact pressure was assumed to be evenly distributed over a circular area with radius 150 mm (tire pressure 0.707 MPa). Poisson's ratio was assumed to be 0.35 for all materials.

The calculations were done for three different thicknesses of layer one, $h_1$: 100, 200 and 400 mm, with moduli of layer one, $E_1$, of 1000 (asphalt during summer, or damaged material), 8000 (asphalt during winter) and 35000 MPa (Portland Cement Concrete). Layer number two was kept constant at a thickness of 200 mm and a modulus of 300 MPa, and for the subgrade three moduli, $E_{sg}$: 30 (soft), 60 and 120 (stiff) MPa were used. Two combinations that would have resulted in structures with equivalent thickness larger than 3000 mm, were omitted. The resulting 25 structures, their equivalent thickness, in mm, and the sensor spacing used, ds in mm, are shown in Table 1:

TABLE 1

Pavement structures used for example.

| | $h_1$ | $h_2$ | $E_1$ | $E_2$ | $E_{sg}$ | $h_e$ | ds |
|---|---|---|---|---|---|---|---|
| 1 | 100 | 200 | 1000 | 300 | 30 | 753 | 1000 |
| 2 | 100 | 200 | 1000 | 300 | 60 | 597 | 1000 |
| 3 | 100 | 200 | 1000 | 300 | 120 | 474 | 1000 |
| 4 | 100 | 200 | 8000 | 300 | 30 | 1075 | 1000 |
| 5 | 100 | 200 | 8000 | 300 | 60 | 853 | 1000 |
| 6 | 100 | 200 | 8000 | 300 | 120 | 677 | 1000 |
| 7 | 100 | 200 | 35000 | 300 | 30 | 1484 | 1000 |
| 8 | 100 | 200 | 35000 | 300 | 60 | 1178 | 1000 |
| 9 | 100 | 200 | 35000 | 300 | 120 | 935 | 1000 |
| 10 | 200 | 200 | 1000 | 300 | 30 | 1075 | 1000 |
| 11 | 200 | 200 | 1000 | 300 | 60 | 853 | 1000 |
| 12 | 200 | 200 | 1000 | 300 | 120 | 677 | 1000 |
| 13 | 200 | 200 | 8000 | 300 | 30 | 1718 | 1000 |
| 14 | 200 | 200 | 8000 | 300 | 60 | 1364 | 1000 |
| 15 | 200 | 200 | 8000 | 300 | 120 | 1082 | 1000 |
| 16 | 200 | 200 | 35000 | 300 | 120 | 1598 | 1000 |
| 17 | 400 | 200 | 1000 | 300 | 30 | 1718 | 1000 |
| 18 | 400 | 200 | 1000 | 300 | 60 | 1364 | 1000 |
| 19 | 400 | 200 | 1000 | 300 | 120 | 1082 | 1000 |
| 20 | 400 | 200 | 8000 | 300 | 120 | 1893 | 1000 |
| 21 | 200 | 200 | 35000 | 300 | 30 | 2536 | 1500 |
| 22 | 200 | 200 | 35000 | 300 | 60 | 2013 | 1500 |
| 23 | 400 | 200 | 8000 | 300 | 30 | 3006 | 1500 |
| 24 | 400 | 200 | 8000 | 300 | 60 | 2385 | 1500 |
| 25 | 400 | 200 | 35000 | 300 | 120 | 2924 | 1500 |

Figure 3:
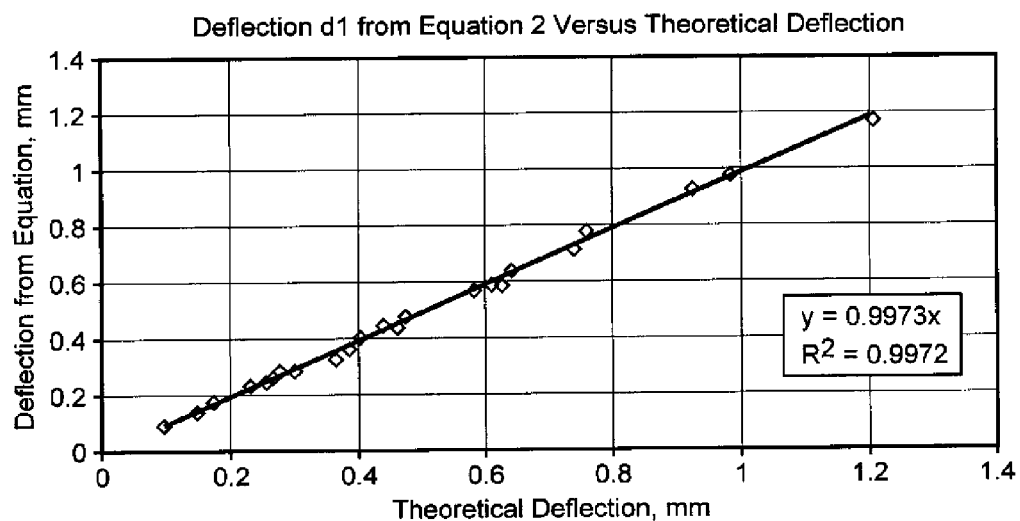
FIG. 3 is a graph showing deflection closest to wheel load sensor E.
Figure 4:
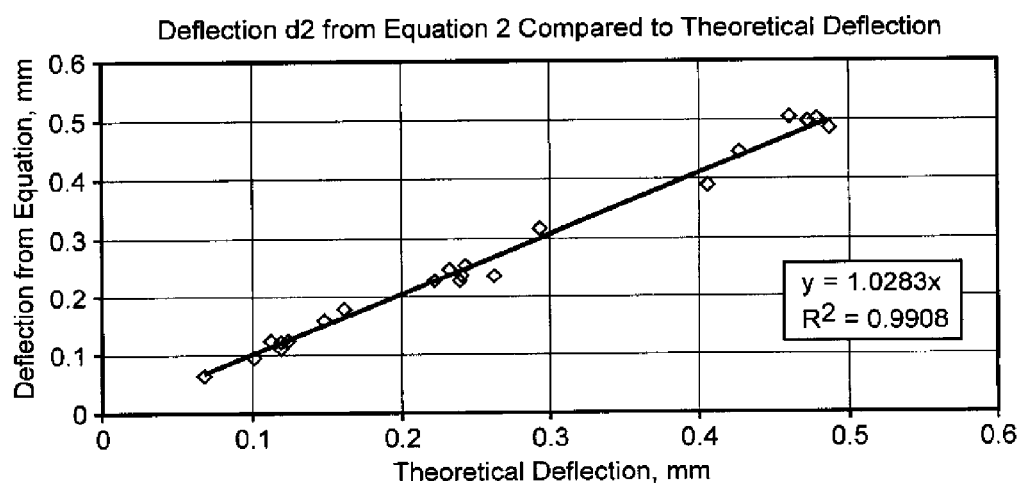
FIG. 4 is a graph showing deflection at one sensor distance from wheel load sensor I.

The deflections closest to the wheel load and at a distance equal to one sensor distance, are shown in FIG. 3 and FIG. 4. The standard error of estimates are 0.015 and 0.013 mm, respectively. The range of deflections, from 0.1 mm to 1.2 mm under a 50 kN wheel load, would cover most normal highway pavement structures.

The pavement deflection alone has limited information on the "bearing capacity" of a pavement. For example, structures No. 3 and No. 21 in Table 1 have almost the same deflection of 0.453 mm and 0.431 mm, respectively. The structures are very different, however. Structure No. 3 has a thin (100 mm) weak (1000 MPa) layer on a stiff subgrade (120 MPa), whereas structure No. 21 has a medium thick (200 mm) stiff (35000 MPa) layer on a weak subgrade (30 MPa).

In the mechanistic-empirical method of pavement design, the permissible number of load applications to cause a certain level of damage to the pavement structure is determined from the critical stresses or strains in the pavement layers. Rutting or roughness of a pavement are normally related to the vertical compressive strain at the top of the subgrade m, and cracking to the horizontal tensile strain at the bottom 20 of a cement- or bitumen-bound layer $i_1$. According to the present invention, an estimate of these critical strains may be obtained by using the following method or procedure.

The subgrade modulus may be calculated from the value of $d_3$ in the equation above using Boussinesq's equation:

$$E_{sg} = \frac{(1-v^2) \times P}{\pi \times 2 \times ds \times d_3}$$

where v is Poisson's ratio (0.35 assumed for the above calculations),

P is the wheel load (50 kN), ds is the sensor distance, and $d_3$ the value from Equation 4.

Figure 5:
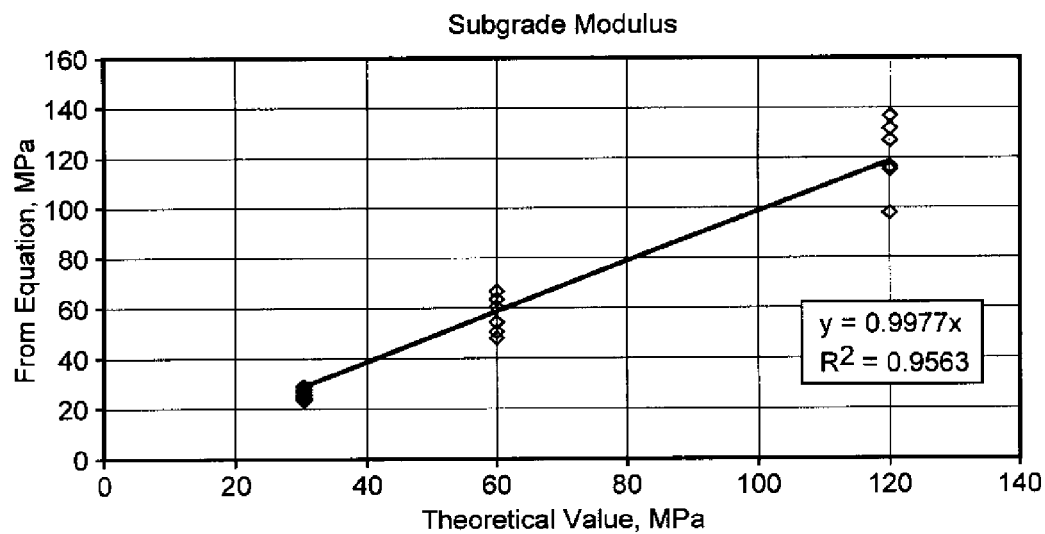
FIG. 5 is a graph showing subgrade modulus from Equation 5 verses theoretical value.

FIG. 5 compares the subgrade modulus calculated from Equation 3 to the theoretical value. The standard error of estimate is 8 MPa.

The equivalent thickness of the pavement layers, $h_e$, may be calculated from:

$$h_e = \exp(A \times (d_1 - d_2)/d_1 + B)$$

where $d_1$ and $d_2$ are calculated from the equations above, and A and B are constants.

For the single wheel, considered in the above example, A and B were −2.621 and 8.279 for a sensor distance of 1000 mm and −3.677 and 8.978 for a sensor distance of 1500 mm. For a beam mounted on a truck, the constants must be adjusted for the influence of all wheel loads.

Figure 6:
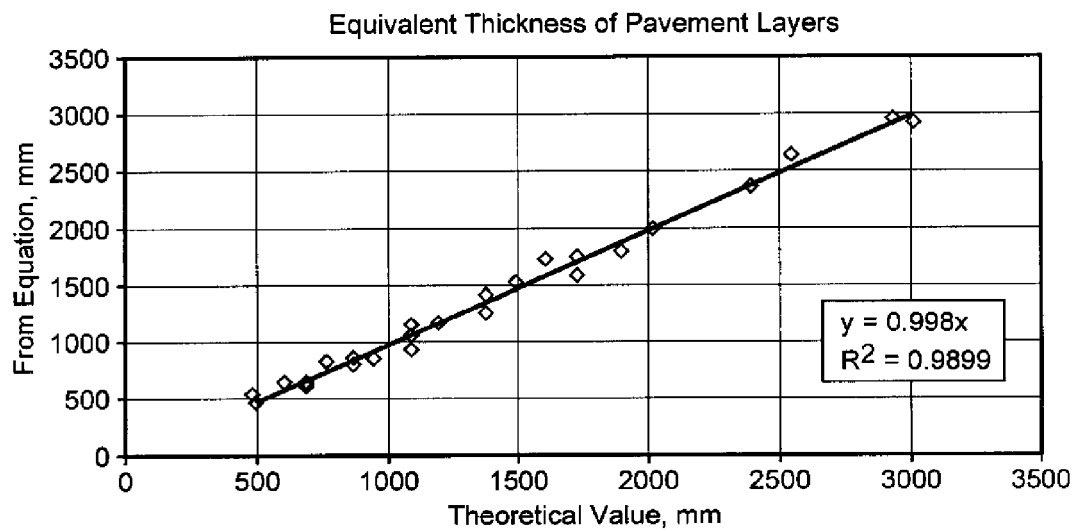
FIG. 6 is a graph showing equivalent thickness of pavement layers from Equation 6 verses theoretical thickness.

In FIG. 6, the equivalent thickness of the pavement layers is compared to the theoretical value in Equation 4. The standard error of estimate on the equivalent thickness is 71 mm.

Having determined the subgrade modulus and the equivalent thickness of the pavement layers, an approximate value for the vertical strain, $\epsilon_z$, at the top of the subgrade may be calculated from:

$$\varepsilon_z = \frac{(1+v) \times \sigma_o}{E_{sg}} \times \left[ \frac{\frac{z}{a}}{\left(\sqrt{1+\left(\frac{z}{a}\right)^2}\right)^3} - (1-2 \times v) \times \left\{ \frac{\frac{z}{a}}{\sqrt{1+\left(\frac{z}{a}\right)^2}} - 1 \right\} \right]$$

where v is Poisson's ratio (0.35 used in the example), $\sigma_o$ is the contact stress in the loaded area (0.707 MPa), $E_{sg}$ is the subgrade modulus, z is $0.8 \times h_e$ (the equivalent thickness), and a is the radius of the loaded area (150 mm).

Figure 7:
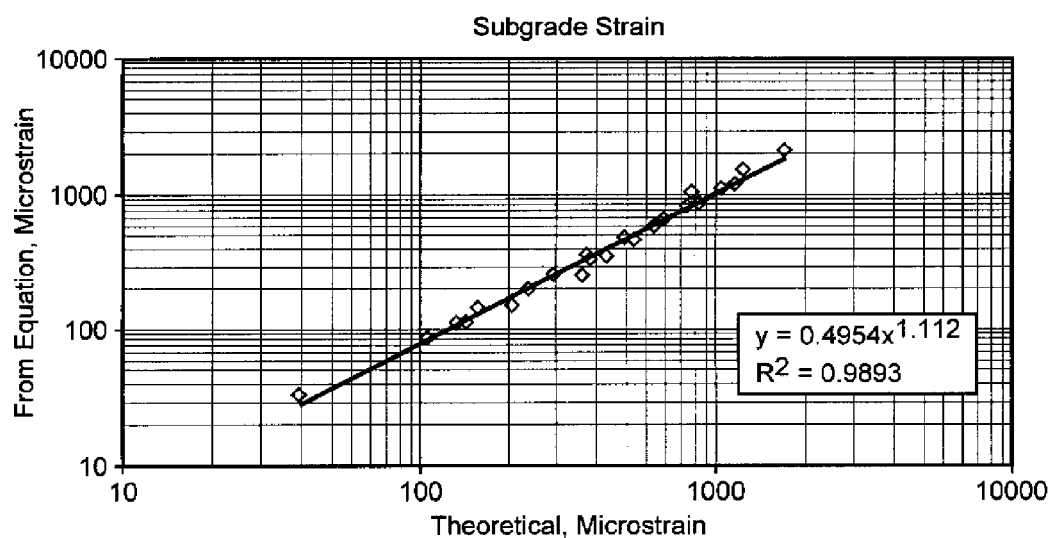
FIG. 7 is a graph showing subgrade strain from Equation 5 verses theoretical strain.

In FIG. 7 the theoretical strain in the subgrade is shown versus the approximate strain calculated from Equation 5. The best estimate of the theoretical strain, $\epsilon_t$ in microstrain, is:

$$\epsilon_t = 0.4954 \times \epsilon_z^{1.112}$$

For structure No. 3 the estimated vertical strain at the top of the subgrade is 845 μstrain and for structure No. 21 it is 332 μstrain. The strain in structure No. 3 is about 2.5 times the strain in No. 21. With damage being roughly proportional to the strain raised to a power of four, structure No. 21 should be able to carry 40 times as much traffic as structure No. 3, even though the deflections of the two structures are almost the same.

A rough estimate of the tensile strain at the bottom of layer one may also be estimated from the radius of curvature, R, calculated from:

$$R = \frac{ds^2}{2 \times (d_1 - d_2)}$$

where
ds is the sensor distance, and
$d_1$ and $d_2$ are the deflections calculated from Equation 4.

Figure 8:
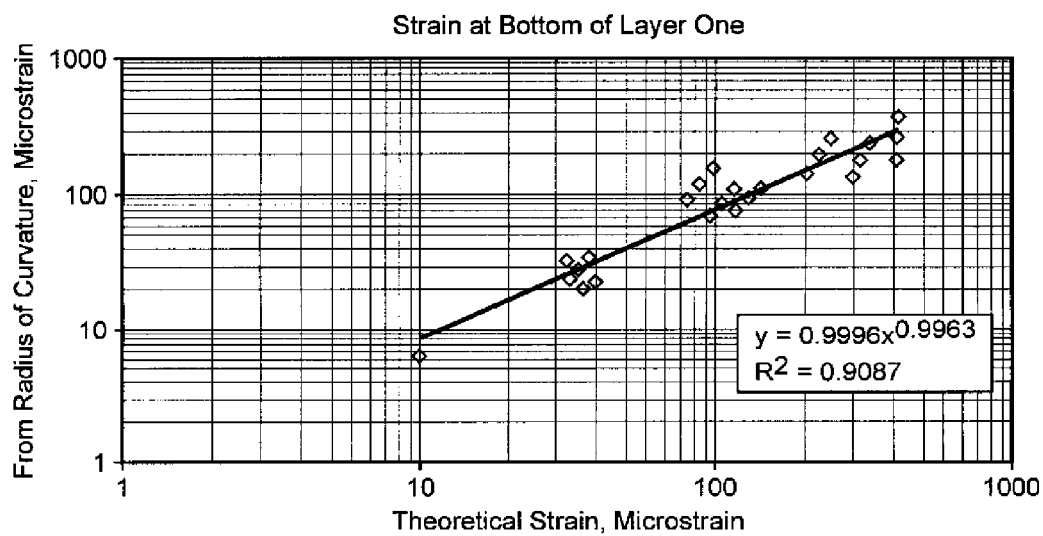
FIG. 8 is a graph showing strain at bottom of layer one from radius of curvature verses theoretical strain.

FIG. 8 shows that strain at the bottom layer one from radius of curvature verses theoretical strain. The strain, in µstrain, at the bottom of layer one is calculated as 350 µstrain/R km.

To get a more precise estimate of the strain at the bottom of layer one it may be necessary to know the thickness of layer one. For the two pavement structures No. 3 and No. 21 the estimated strains at the bottom of layer one are 233 and 97 µstrain, respectively, or a difference similar to the difference between the vertical strains at the top of the subgrade for the two structures.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. Therefore, the spirit and scope of the invention should not be limited to the versions described above.

We claim:

1. A rolling weight pavement deflection and load measurement system, comprising:
   a rolling weight;
   a sensor holding frame arranged to move in unison with said rolling weight;
   at least six sensors mounted to said frame, with a first of said sensors configured to measure the distance between said first sensor and the point of maximum deflection caused by said rolling weight, each of said sensors configured to measure the distance between itself and a pavement, wherein the distance measurements are capable of being used to calculate deflections in said pavement and wherein said calculated deflections are capable of being used to calculate strain measurements in said pavement.

2. The system of claim 1, wherein said pavement has an associated subgrade modulus and equivalent thickness, wherein said deflections are calculated and used to calculate the subgrade modulus and equivalent thickness.

3. The system of claim 2, wherein said system comprises at least nine sensors with an equal distance ds between adjacent ones of said sensors; and
   wherein said subgrade modulus is calculated with the equation $$E_{sg} = \frac{(1-v^2)P}{\pi \times 2 \times ds \times d_3}$$

where $E_{sg}$ is said subgrade modulus, v is Poisson's ratio, P is the wheel load, and $d_3$ is a calculated deflection of the pavement at one of said sensors.

4. The system of claim 2, wherein the equivalent thickness is calculated with the equation $$h_e = \exp(A \times (d_1 - d_2)/d_1 + B)$$

where $h_e$ is the equivalent thickness, A is a constant, B is a constant, and each of $d_1$ and $d_2$ is a calculated deflection of the pavement at one of said sensors.

5. The system of claim 1, wherein deflections and strain measurements are calculated and one of said strain measurements comprises vertical strain at the top of the subgrade calculated from $$\varepsilon_z = \frac{(1+v) \times \sigma_o}{E_{sg}} \times \left[ \frac{\frac{z}{a}}{\left(\sqrt{1+\left(\frac{z}{a}\right)^2}\right)^3} - (1 - 2 \times v) \times \left\{ \frac{\frac{z}{a}}{\sqrt{1+\left(\frac{z}{a}\right)^2}} - 1 \right\} \right].$$

where $\varepsilon_z$ is vertical strain, v is Poisson's ratio, $\sigma_o$ is a contact stress in a loaded area, $E_{sg}$ is the subgrade modulus, z is the equivalent thickness multiplied by an adjustment factor, and a is the radius of the loaded area.

6. The system of claim 1, wherein said pavement comprises a cement- or bitumen-bound layer, and wherein the tensile strain at the bottom of said cement- or bitumen-bound layer can be estimated from the radius of curvature.

7. The system of claim 6, wherein said tensile strain is estimated by the equation Strain=350 µstrain/R km where R is the radius of curvature.

8. The system of claim 1, wherein said first of said sensors is mounted above said point of maximum deflection.

9. The system of claim 1, wherein a second of said sensors is mounted between said first sensor and a third of said sensors; and
   wherein said pavement has an associated equivalent thickness, and wherein the distance between said first sensor and said third sensor is at least equal to the equivalent thickness of the pavement layers with respect to the subgrade.

10. A pavement deflection and load measurement system, comprising:
    a weight for causing deflection in a pavement; and
    a plurality of sensors, with a first of said sensors arranged to measure the distance between said first sensor and a point of maximum deflection in said pavement and with a third of said sensors arranged such that a second of said sensors is between said first sensor and said third sensor, each of said sensors measuring the distance between itself and the pavement being measured, wherein said pavement comprises pavement layers, said pavement having an associated subgrade modulus and equivalent thickness with respect to the subgrade, wherein the distance between said first sensor and said third sensor is at least equal to the equivalent thickness of said pavement layers, and wherein the distance measurements are capable of being used to calculate deflections in said pavement and said calculated deflections are capable of being used to calculate strain measurements in said pavement.

11. The system of claim 10, wherein said weight comprises a rolling weight.

12. The system of claim 11, wherein said sensors are arranged to move in unison with said rolling weight.

13. A method for measuring the deflection of pavement, comprising:
provided a rolling weight with an associated first measuring point and at least five measuring points ahead of said rolling weight on said pavement;
measuring the distance to the pavement at least three of said measuring points;
rolling said weight a first time at a first distance and measuring the distance between at least three of said measuring points and said pavement at a second time;
rolling said weight a second time at a second distance and measuring the distance between at least three of said measuring points and said pavement at a third time; and
calculating strain measurements in said pavement using said distance measurements.

14. The method of claim 13, wherein said pavement has an associated subgrade modulus and equivalent thickness, wherein said distance measurements are used to calculate the subgrade modulus and equivalent thickness of said pavement, and wherein said subgrade modulus and said equivalent thickness are utilized for said calculating of said strain measurements.

15. The method of claim 14, wherein said system comprises at least nine sensors with an equal distance ds between adjacent ones of said sensors; and
wherein said subgrade modulus is calculated with the equation $$E_{sg} = \frac{(1-v^2) \times P}{\pi \times 2 \times ds \times d_3}$$

where $E_{sg}$ is said subgrade modulus, $v$ is Poisson's ratio, $P$ is the wheel load, and $d_3$ is a deflection of the pavement at one of said sensors.

16. The method of claim 13, wherein said pavement has an associated equivalent thickness; and
wherein the equivalent thickness of said pavement is calculated with the equation $$h_e = \exp(A \times (d_1 - d_2)/d_1 + B)$$

where $h_e$ is the equivalent thickness, A is a constant, B is a constant, and each of $d_1$ and $d_2$ is a deflection of the pavement at one of said sensors.

17. The method of claim 16, wherein said pavement has an associated subgrade modulus and equivalent thickness, wherein one of said strain measurements comprises vertical strain at the top of the subgrade calculated from $$\varepsilon_z = \frac{(1+v) \times \sigma_o}{E_{sg}} \times \left[ \frac{\frac{z}{a}}{\left(\sqrt{1+\left(\frac{z}{a}\right)^2}\right)^3} - (1-2\times v) \times \left\{ \frac{\frac{z}{a}}{\sqrt{1+\left(\frac{z}{a}\right)^2}} - 1 \right\} \right]$$

where $\varepsilon_z$ is vertical strain, $v$ is Poisson's ratio, $\sigma_o$ is a contact stress in a loaded area, $E_{sg}$ is the subgrade modulus, z is the equivalent thickness multiplied by an adjustment factor, and a is the radius of the loaded area.

18. The method of claim 13, wherein said pavement comprises a cement- or bitumen-bound layer, and wherein the tensile strain at the bottom of said cement- or bitumen-bound layer can be estimated from the radius of curvature.

19. The system of claim 18, wherein said tensile strain is estimated by the equation Strain=350 μstrain/R km where R is the radius of curvature.

20. The method of claim 13, comprising
measuring the distance between at least six of said measuring points and said pavement at said second time and said third time.

21. The system of claim 1, wherein said system comprises at least nine sensors with equal distance between adjacent ones of said sensors.

22. The system of claim 10, wherein said sensors are arranged with equal distance between adjacent ones of said sensors.

23. The method of claim 13, wherein said at least five measuring points ahead of said rolling weight on said pavement comprises at least eight equidistant measuring points ahead of said rolling weight on said pavement.

24. The method of claim 23, wherein said first distance and said second distance are approximately equal to the distance between said equidistant measuring points.

* * * * *